United States Patent
Guo

(10) Patent No.: US 10,236,682 B2
(45) Date of Patent: Mar. 19, 2019

(54) INRUSH CURRENT FREE SWITCHING APPARATUS AND CONTROL METHOD THEREOF

(71) Applicants: GUANGZHOU KINGSER ELECTRONICS CO., LTD, Guangzhou, Guangdong (CN); Qiaoshi Guo, Guangzhou, Guangdong (CN)

(72) Inventor: Qiaoshi Guo, Guangzhou (CN)

(73) Assignees: Qiaoshi Guo, Guangzhou, Guangdong (CN); GUANGZHOU KINGSER ELECTRONICS CO., LTD., Guangzhou, Guangdong (CN)

( * ) Notice: Subject to any disclaimer, the term of this patent is extended or adjusted under 35 U.S.C. 154(b) by 49 days.

(21) Appl. No.: 15/686,681

(22) Filed: Aug. 25, 2017

(65) Prior Publication Data
US 2018/0006446 A1 Jan. 4, 2018

Related U.S. Application Data

(63) Continuation of application No. PCT/CN2016/092015, filed on Jul. 28, 2016, and a
(Continued)

(30) Foreign Application Priority Data

Feb. 27, 2015 (CN) .......................... 2015 1 0095403
Mar. 31, 2015 (CN) .......................... 2015 1 0165773
(Continued)

(51) Int. Cl.
*H02H 7/00* (2006.01)
*H02H 9/00* (2006.01)
*H01H 50/44* (2006.01)

(52) U.S. Cl.
CPC ............ *H02H 9/005* (2013.01); *H01H 50/44* (2013.01); *H02H 9/001* (2013.01)

(58) Field of Classification Search
USPC ............................................. 361/2, 3, 8, 152
See application file for complete search history.

(56) References Cited

U.S. PATENT DOCUMENTS 3,947,726 A * 3/1976 DeCecco ................. H02H 7/12
361/56
5,633,540 A * 5/1997 Moan ..................... H01H 9/542
307/125
(Continued)

FOREIGN PATENT DOCUMENTS

CN 201075345 Y 6/2008
CN 201359695 Y 12/2009
(Continued)

OTHER PUBLICATIONS

State Intellectual Property Office of the P.R. China (ISR/CN), "International Search Report for PCT/CN2016/092015", China, dated Nov. 10, 2016.
(Continued)

*Primary Examiner* — Ronald W Leja
(74) *Attorney, Agent, or Firm* — Tim Tingkang Xia, Esq.; Locke Lord LLP

(57) ABSTRACT

The invention relates to an inrush current free switching apparatus and control method thereof. The inrush current free switching apparatus includes a mechanical switch, a first unidirectional thyristor, a second unidirectional thyristor, a control unit, and a current limiting element. The first unidirectional thyristor is connected with the current limiting element in series to form a series circuit, the series circuit is connected with the second unidirectional thyristor in parallel, two ends of a main circuit of the mechanical switch is connected with the second unidirectional thyristor in
(Continued)

parallel, the control unit is connected with the control terminal of the mechanical switch, the control unit is connected with the first unidirectional thyristor and the second unidirectional thyristor. The control unit prestores operating time parameters of the mechanical switch.

11 Claims, 1 Drawing Sheet

Related U.S. Application Data continuation of application No. PCT/CN2016/074672, filed on Feb. 26, 2016.

(30) Foreign Application Priority Data

| Mar. 31, 2015 | (CN) | 2015 1 0165774 |
| May 8, 2015 | (CN) | 2015 1 0242486 |
| May 8, 2015 | (CN) | 2015 1 0242487 |
| Jul. 29, 2015 | (CN) | 2015 1 0476784 |
| Oct. 25, 2015 | (CN) | 2015 1 0735615 |
| Nov. 15, 2015 | (CN) | 2015 1 0827126 |
| Nov. 15, 2015 | (CN) | 2015 1 0827430 |
| Jul. 5, 2016 | (CN) | 2016 1 0551887 |

(56) References Cited

U.S. PATENT DOCUMENTS

| 6,028,471 | A * | 2/2000 | Koyama | H01H 9/542 327/108 |
| 6,643,112 | B1 * | 11/2003 | Carton | H01H 9/54 218/3 |
| 6,650,245 | B2 * | 11/2003 | Chung | H01H 9/542 318/757 |
| 8,035,938 | B2 * | 10/2011 | Divan | H02H 3/025 361/106 |
| 8,582,262 | B2 * | 11/2013 | Divan | H02H 3/025 361/58 |
| 9,048,654 | B2 * | 6/2015 | Divan | H02H 9/001 |
| 2003/0184926 | A1 | 10/2003 | Wu et al. | |
| 2007/0121257 | A1 * | 5/2007 | Maitra | H01H 9/542 361/2 |
| 2008/0094771 | A1 * | 4/2008 | Messersmith | H01H 9/542 361/100 |
| 2008/0247106 | A1 * | 10/2008 | Divan | H02H 9/001 361/58 |
| 2014/0078622 | A1 * | 3/2014 | Crane | H02H 3/087 361/8 |
| 2018/0006446 | A1 * | 1/2018 | Guo | H02H 9/001 |

FOREIGN PATENT DOCUMENTS

| CN | 201570865 U | 9/2010 |
| CN | 102623220 A | 8/2012 |
| CN | 102946106 A | 2/2013 |
| JP | H08300149 A | 11/1996 |

OTHER PUBLICATIONS

State Intellectual Property Office of the P.R. China (ISR/CN), "International Search Report for PCT/CN2016/074672", China, dated Apr. 28, 2016.

* cited by examiner

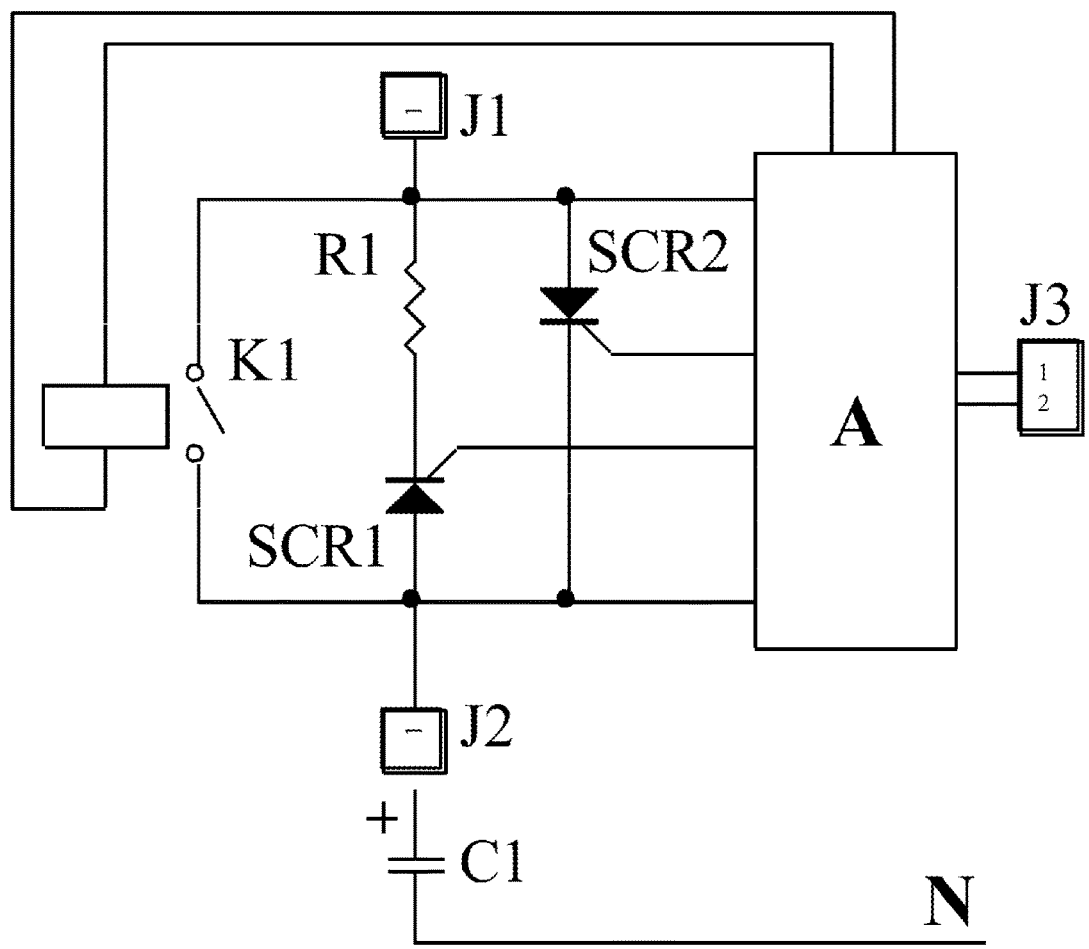

INRUSH CURRENT FREE SWITCHING APPARATUS AND CONTROL METHOD THEREOF

CROSS-REFERENCE TO RELATED APPLICATIONS

This application is a continuation application of International Patent Application No. PCT/CN2016/092015, filed Jul. 28, 2016, which itself claims priority to and benefit of Chinese Patent Application No. 201510476784.X, filed Jul. 29, 2015, Chinese Patent Application No. 201510827430.5, filed Nov. 15, 2015, Chinese Patent Application No. 201510827126.0, filed Nov. 15, 2015, and Chinese Patent Application No. 201610551887.2, filed Jul. 5, 2016, in the State Intellectual Property Office of P.R. China, which are hereby incorporated herein in their entireties by reference.

This application is a continuation-in-part application of International Patent Application No. PCT/CN2016/074672, filed Feb. 26, 2016, which itself claims priority to and benefit of Chinese Patent Application No. 201510095403.3, filed Feb. 27, 2015, Chinese Patent Application No. 201510165773.X, filed Mar. 31, 2015, Chinese Patent Application No. 201510165774.4, filed Mar. 31, 2015, Chinese Patent Application No. 201510242486.4, filed May 8, 2015, Chinese Patent Application No. 201510242487.9, filed May 8, 2015, Chinese Patent Application No. 201510476784.X, filed Jul. 29, 2015, Chinese Patent Application No. 201510735615.3, filed Oct. 25, 2015, and Chinese Patent Application No. 201510827126.0, filed Nov. 15, 2015, in the State Intellectual Property Office of P.R. China, which are hereby incorporated herein in their entireties by reference.

TECHNICAL FIELD

The present invention relates generally to the field of electrics, and more particularly, to an apparatus and a control method for inrush current free switching for capacitors and capacitive-like loads.

BACKGROUND

Currently, applications of hybrid switches and inrush current free switching apparatuses in electrical control systems for making and breaking control of power capacitors and other loads are popular, which adopts two unidirectional thyristors connected in anti-parallel, and connected with a mechanical switch (such as a magnetic latching relay and electromagnetic-like switches) in parallel. During the making process, the control unit first controls two unidirectional thyristors to conduct at zero-crossing before the mechanical switch is closed, then controls the mechanical switch to close. The hybrid switches have the following disadvantages:

1. Due to existings of short-circuit, breakdown, self-healing situations for the capacitor loads, the generated current is extremely large in the case of no series reactance, the thyristor has a limited overload capacity itself as a semiconductor device, and is easy to break down.

2. The thyristor has a long conduction time, a low power utilization rate, a low cost effectiveness, a poor overload capacity, and is easy to break down.

Due to above reasons, the rated current of the hybrid switches currently can reach only dozens of amperes. Thus, the hybrid switches have a poor reliability performance.

SUMMARY

One of the objectives of the present invention is to provide a inrush current free switching apparatus and a control method that have a short thyristor conduction time, a strong overload capacity, a high cost effectiveness, a long electrical lifetime of the mechanical switch and a high reliability so as to overcome the disadvantages of the existing hybrid switches and inrush current free switching apparatuses.

The objective of the present invention is implemented through the following technical solutions:

A inrush current free switching apparatus includes a mechanical switch, a first unidirectional thyristor, a second unidirectional thyristor, a control unit, and a current limiting element. The first unidirectional thyristor is connected with the current limiting element in series to form a series circuit. The series circuit is connected with the second unidirectional thyristor in parallel. Two ends of a main circuit of the mechanical switch is connected with the second unidirectional thyristor in parallel. The control unit is connected with the control terminal of the mechanical switch. The control unit is connected with the first unidirectional thyristor and the second unidirectional thyristor. The control unit pre-stores operating time parameters of the mechanical switch.

In one embodiment of the inrush current free switching apparatus, during a making process, the control unit controls the mechanical switch to close during a interval after the first unidirectional thyristor is conducted at a zero-crossing until a next current zero point.

In one embodiment of the inrush current free switching apparatus, during the making process, the control unit provides the first unidirectional thyristor with a conduction control signal when the anode of the first unidirectional thyristor has a negative potential relative to the cathode of the first unidirectional thyristor.

In one embodiment of the inrush current free switching apparatus, during a breaking process, the control unit controls the mechanical switch to break during a interval after an anode of the first unidirectional thyristor has a positive potential peak relative to a cathode of the first unidirectional thyristor until a second current zero point.

In one embodiment of the inrush current free switching apparatus, during the breaking process, the control unit controls the mechanical switch to break when an anode of the second unidirectional thyristor has a positive potential relative to a cathode of the second unidirectional thyristor.

In one embodiment of the inrush current free switching apparatus, the current limiting element is a current limiting resistor.

In one embodiment of the inrush current free switching apparatus, the current limiting resistor is a resistance wire.

In one embodiment of the inrush current free switching apparatus, the mechanical switch is an electromagnetic switch, and the control terminal of the mechanical switch is a control coil of the electromagnetic switch.

In one embodiment of the inrush current free switching apparatus, the first unidirectional thyristor is connected to the second unidirectional thyristor in anti-parallel.

In one aspect of the invention, a control method of the inrush current free switching apparatus according to the embodiments disclosed above, during the making process, the control unit first controls the first unidirectional thyristor to conduct at the zero-crossing, and the control unit controls the mechanical switch to close during the interval after the first unidirectional thyristor is conducted until the next current zero point. During the breaking process, the control unit controls the mechanical switch to break during the interval after the anode of the first unidirectional thyristor has a positive potential peak relative to the cathode of the first unidirectional thyristor until the second current zero point.

In another aspect of the invention, a control method of the inrush current free switching apparatus according to the embodiments disclosed above, during the making process, the control unit provides the first unidirectional thyristor with a conduction control signal when the anode of the first unidirectional thyristor is negative potential relative to the cathode of the first unidirectional thyristor, the control unit controls the mechanical switch to close during the interval after the first unidirectional thyristor is conducted until the next current zero point. During the breaking process, the control unit controls the mechanical switch to break when the anode of the second unidirectional thyristor has a positive potential relative to the cathode of the second unidirectional thyristor.

Its Working Principle:

During the making process, the control unit provides a first unidirectional thyristor with a conduction control signal when the anode of the first unidirectional thyristor has a negative potential relative to the cathode of the first unidirectional thyristor, and the first unidirectional thyristor is conducted without inrush current when the anode of the first unidirectional thyristor is zero-crossing forward bias to the cathode of the unidirectional thyristor. The control unit controls the mechanical switch to close during the interval after the zero-crossing conduction of the first unidirectional thyristor until the next current zero point, to reduce the conduction time of the first unidirectional thyristor and the time of current passing through the current limiting element.

During the breaking process, the control unit controls the mechanical switch to break during the interval after the anode of the first unidirectional thyristor has a positive potential peak relative to the cathode of the first unidirectional thyristor until the second current zero point, to reduce the influence of current limiting element to arc suppressing effect of the mechanical switch. When the control unit controls the mechanical switch to break when the anode of the second unidirectional thyristor has a positive potential relative to the cathode of the second unidirectional thyristor (i.e., during the interval after the anode of the first unidirectional thyristor has a positive potential peak relative to the cathode of the first unidirectional thyristor until the second current zero point), the arc suppressing effect of the mechanical switching will not be affected by the current limiting element.

According to the present invention, the inrush current free switching apparatus has the advantages of the short thyristor conduction time, strong overload capacity, high cost effectiveness, long electrical lifetime of the mechanical switch and high reliability.

BRIEF DESCRIPTION OF THE DRAWINGS

FIG. 1 is a schematic circuit diagram of a first embodiment of a inrush current free switching apparatus of the present invention.

DETAILED DESCRIPTION

Referring to FIG. 1, a first embodiment of a inrush current free switching apparatus of the present invention is shown.

A inrush current free switching apparatus includes a mechanical switch K1 (which is an electromagnetic switch in one embodiment, its control terminal is a control coil of the electromagnetic switch, and can also be other mechanical switches). The inrush current free switching apparatus further includes a first unidirectional thyristor (silicon controlled rectifier) SCR1, a second unidirectional thyristor (silicon controlled rectifier) SCR2, a control unit (A), a current limiting element R1 (which is a current limiting resistor in one embodiment). The first unidirectional thyristor SCR1 and the current limiting element R1 are connected in series to form a series circuit. The series circuit is connected in parallel with the second unidirectional thyristor SCR2. The two ends of the main circuit of the mechanical switch K1 are connected in parallel with the second unidirectional thyristor SCR2. The control units (A) is connected with the control terminal of the mechanical switch K1, and the control units (A) is also connected with the first unidirectional thyristor SCR1 and the second unidirectional thyristor SCR2. In addition, the control unit (A) prestores the operation time parameters of the mechanical switch K1.

Working Principle:

In the making process, the control unit (A) provides a first unidirectional thyristor SCR1 with a conduction control signal when the anode of the first unidirectional thyristor SCR1 has a negative potential relative to the cathode of the first unidirectional thyristor SCR1 (which could greatly reduce the impact of the load current on the first unidirectional thyristor SCR1 when the capacitive load is connected), when the anode of the first unidirectional thyristor SCR1 is zero-crossing forward-biased to the cathode of the first unidirectional thyristor SCR1, the first unidirectional thyristor SCR1 is conducted without inrush current, and the input power source passes through the J1 terminal, the current limiting element R1, the first unidirectional thyristor SCR1, and the J2 terminal to connect the capacitor C1 without inrush current, the control unit (A) controls the mechanical switch K1 to close during the interval after the zero-crossing conduction of the first unidirectional thyristor SCR1 until the next current zero point, to reduce the conduction time of the first unidirectional thyristor SCR1 and the time of current passing through the current limiting element R1.

In the breaking process, the control unit (A) controls the mechanical switch K1 to break during the interval after the anode of the first unidirectional thyristor SCR1 has a positive potential peak (i.e., the peak value of the current of the mechanical switch K1) relative to the cathode of the first unidirectional thyristor SCR1 until the second current zero point to reduce the influence of the current limiting element R1 to the arc suppressing effect of the mechanical switch K1. When the control unit (A) controls the mechanical switch K1 to break when the anode of the second unidirectional thyristor SCR2 is positive potential to the cathode of the second unidirectional thyristor SCR2 (i.e., break after the anode of the first unidirectional thyristor SCR1 has a positive potential peak (i.e., the peak value of the current through the mechanical switch K1) relative to the cathode of the first unidirectional thyristor SCR1, during the period from the first current zero point to the second current zero point) to ensure that the second unidirectional thyristor SCR2 can be conducted in the forward direction. The conduction control signal of the second unidirectional thyristor can be provided by the control unit, it can also be driven to be conducted by the potential difference across the two ends of the mechanical switch K1 when the mechanical switch K1 breaks), to achieve the purposes of no arc breaking of the mechanical switch K1, and the breaking with arc suppressing effect of the mechanical switch K1 will not be affected by the current limiting element R1.

In the above embodiments, the J3 ports of FIG. 1 above are used for power supply and control. Practically, the J3 terminal can be used as a control port and the control unit (A) is connected with an operating power supply. In the above embodiments, the operation principle of the present invention is described simply by using a single-pole switch. When a three-phase power is adapted, as long as the number of corresponding mechanical switches K1, unidirectional thyristor and other related components is increased accordingly, the control unit (A) can be adapted to control them. The corresponding working principle is the same, without departing from its spirit and the scope of the invention.

According to the present invention, the above embodiments have the following advantages:

1. The first unidirectional thyristor SCR1 is connected in series with the current limiting element R1, to overcome the impact to the unidirectional thyristor during the breakdown, short circuit, and self-healing process of the capacitor load, the short-circuit current can be defined by the current limiting element R1.

2. The control unit (A) prestores the operation time parameters of the mechanical switch K1, which greatly reduces the time of current passing through the current limiting element R1, the first unidirectional thyristor SCR1 and the second unidirectional thyristor SCR2, greatly increases the overload capacity, and greatly reduces the power requirements of the current limiting element R1, the first unidirectional thyristor SCR1, and the second unidirectional thyristor SCR2. In addition, the current limiting element R1 can directly use a resistance wire, which is very cost-effective.

3. During the making process, it is conducted without inrush current by the first unidirectional thyristor SCR1. In the breaking process, it is conducted with arc suppressing by the second unidirectional thyristor SCR2, which overcomes the voltage drop caused by the current limiting element R1 and influences to the arc suppressing effect of the mechanical switch K1, thereby prolonging the electric lifetime of the mechanical switch K1.

One aspect of the present invention also provides a control method for the inrush current free switching apparatus as shown in FIG. 1. The control unit (A) first controls the first unidirectional thyristor SCR1 to conduct at zero-crossing, and the control unit (A) controls the mechanical switch K1 to close during the interval after the first unidirectional thyristor SCR1 is conducted until the next current zero point, for reducing the conduction time of the first unidirectional thyristor SCR1 and increasing the overload capacity thereof. In the breaking process, the control unit (A) controls the mechanical switch K1 to break during the interval after the anode of the first unidirectional thyristor SCR1 has a positive potential peak relative to the cathode of the first unidirectional thyristor SCR1 (i.e., the peak value of the current of the mechanical switch K1) until the second current zero point, to reduce the influence of the current limiting element R1 to the arc suppressing effect of the mechanical switch K1.

In one embodiment, the control method for the inrush current free switching apparatus as shown in FIG. 1, includes, in the making process, the control unit (A) provides a first unidirectional thyristor SCR1 conduction control signal when the anode of the first unidirectional thyristor has a negative potential relative to the cathode of the first unidirectional thyristor SCR1, to reduce the impact of the load current to the first unidirectional thyristor SCR1 when the capacitive load is connected, when the anode of the first unidirectional thyristor SCR1 is zero-crossing positively biased to the cathode of the first unidirectional thyristor SCR1, the first unidirectional thyristor SCR1 is conducted without inrush current, the control unit (A) controls the mechanical switch K1 to close during the interval after the first unidirectional thyristor SCR1 is conducted until the next current zero point, to reduce the conduction time of the first unidirectional thyristor SCR1 and increase the overload capacity thereof. During the breaking process, the control unit (A) controls the mechanical switch K1 to break when the anode of the second unidirectional thyristor SCR2 is positive potential to the cathode of the second unidirectional thyristor SCR2, to overcome the influence of the current limiting element R1 to the arc suppressing effect of the mechanical switch K1.

What is claimed is:

1. A inrush current free switching apparatus, comprising: a mechanical switch, and a first unidirectional thyristor, a second unidirectional thyristor, a control unit, and a current limiting element, wherein the first unidirectional thyristor is connected with the current limiting element in series to form a series circuit; the series circuit is connected with the second unidirectional thyristor in parallel; two ends of a main circuit of the mechanical switch is connected with the second unidirectional thyristor in parallel; the control unit is connected with a control terminal of the mechanical switch; the control unit is connected with the first unidirectional thyristor and the second unidirectional thyristor; and the control unit prestores operating time parameters of the mechanical switch.

2. The inrush current free switching apparatus according to claim 1, wherein during a making process, the control unit controls the mechanical switch to close during a interval after a zero-crossing conduction of the first unidirectional thyristor until a next current zero point.

3. The inrush current free switching apparatus according to claim 2, wherein during the making process, the control unit provides the first unidirectional thyristor with a conduction control signal when an anode of the first unidirectional thyristor has a negative potential relative to a cathode of the first unidirectional thyristor.

4. The inrush current free switching apparatus according to claim 1, wherein during a breaking process, the control unit controls the mechanical switch to break during a interval after an anode of the first unidirectional thyristor has a positive potential peak relative to a cathode of the first unidirectional thyristor until a second current zero point.

5. The inrush current free switching apparatus according to claim 4, wherein during the breaking process, the control unit controls the mechanical switch to break when an anode of the second unidirectional thyristor has a positive potential relative to a cathode of the second unidirectional thyristor.

6. The inrush current free switching apparatus according to claim 1, wherein the current limiting element is a current limiting resistor.

7. The inrush current free switching apparatus according to claim 6, wherein the current limiting resistor is a resistance wire.

8. The inrush current free switching apparatus according to claim 1, wherein the mechanical switch is an electromagnetic switch, and the control terminal of the mechanical switch is a control coil of the electromagnetic switch.

9. The inrush current free switching apparatus according to claim 1, wherein the first unidirectional thyristor is connected to the second unidirectional thyristor in anti-parallel.

10. The control method according to claim 1, wherein during a making process, the control unit controls the first unidirectional thyristor to conduct at zero-crossing, and the control unit controls the mechanical switch to close during a interval after conduction of the first unidirectional thyristor until a next current zero point; and during a breaking process, the control unit controls the mechanical switch to break during a interval after an anode of the first unidirectional thyristor has a positive potential peak relative to a cathode of the first unidirectional thyristor until a second current zero point.

11. The control method of the inrush current free switching apparatus according to claim 10, wherein during the making process, the control unit provides the first unidirectional thyristor a conduction control signal when the anode of the first unidirectional thyristor has a negative potential relative to the cathode of the first unidirectional thyristor, and the control unit controls the mechanical switch to close during the interval after the first unidirectional thyristor is conducted until the next current zero point; and during the breaking process, the control unit controls the mechanical switch to break when the anode of the second unidirectional thyristor has a positive potential relative to the cathode of the second unidirectional thyristor.

\* \* \* \* \*